(12) United States Patent
Cook

(10) Patent No.: US 12,184,806 B2
(45) Date of Patent: Dec. 31, 2024

(54) SURFACE-MOUNTED ELECTRONIC APPARATUS

(71) Applicant: Christopher Cook, Marlow (GB)

(72) Inventor: Christopher Cook, Marlow (GB)

( * ) Notice: Subject to any disclaimer, the term of this patent is extended or adjusted under 35 U.S.C. 154(b) by 503 days.

(21) Appl. No.: 17/438,904

(22) PCT Filed: Mar. 11, 2020

(86) PCT No.: PCT/GB2020/050584
§ 371 (c)(1),
(2) Date: Sep. 13, 2021

(87) PCT Pub. No.: WO2020/183156
PCT Pub. Date: Sep. 17, 2020

(65) Prior Publication Data
US 2022/0150342 A1 May 12, 2022

(30) Foreign Application Priority Data

Mar. 11, 2019 (GB) .................................. 1903269
Jun. 20, 2019 (GB) .................................. 1908867

(51) Int. Cl.
*H04M 1/04* (2006.01)
*H01R 13/447* (2006.01)
*H02J 7/00* (2006.01)
*H02J 50/10* (2016.01)

(52) U.S. Cl.
CPC ............ *H04M 1/04* (2013.01); *H01R 13/447* (2013.01); *H02J 7/0044* (2013.01); *H02J 50/10* (2016.02); *H02J 7/0013* (2013.01)

(58) Field of Classification Search
CPC .......... H04M 1/04; H02J 50/10; H02J 7/0044; H02J 7/0013; H01R 13/447
See application file for complete search history.

(56) References Cited

U.S. PATENT DOCUMENTS 5,539,821 A * 7/1996 Blonder ................ H02J 7/0044
379/454
2008/0272258 A1 11/2008 Wysoczynski
2012/0019198 A1 1/2012 Clouser
(Continued)

FOREIGN PATENT DOCUMENTS

CN 104883423 A 9/2015
CN 206641717 U 11/2017
(Continued)

OTHER PUBLICATIONS

Hinojosa, Christopher, Retractable Cable Reel For Charging Electronid Device, pp. 1-4 (Year: 2016).*
(Continued)

*Primary Examiner* — Keith Ferguson
(74) *Attorney, Agent, or Firm* — Hodgson Russ LLP

(57) ABSTRACT

A support apparatus (100) for a device has a housing having a mounting portion (104, 108) configured to be received between a plug socket (58) and an associated wall. It also has a support portion (114) configured to support a device in an upright position, the support portion connected to the mounting portion such that the support portion covers the plug socket in use. A speaker or a charger for a mobile device (10) may be provided as the device.

22 Claims, 14 Drawing Sheets

(56) References Cited

U.S. PATENT DOCUMENTS

| | | | |
|---|---|---|---|
| 2012/0318941 A1* | 12/2012 | Gourley | H02J 7/02 |
| | | | 248/205.1 |
| 2013/0285609 A1 | 10/2013 | Clouser | |
| 2015/0194832 A1 | 7/2015 | Benigno | |
| 2018/0231599 A1* | 8/2018 | Wang | H01R 13/665 |
| 2018/0287425 A1 | 10/2018 | Mortun | |

FOREIGN PATENT DOCUMENTS

| | | |
|---|---|---|
| CN | 207765722 U | 8/2018 |
| CN | 108808806 A | 11/2018 |
| GB | 2367697 A | 4/2002 |
| GB | 2401491 A | 11/2004 |

OTHER PUBLICATIONS

WIPO, International Search Report for PCT/GB2020/050584, Jun. 9, 2020.

IPO, Search Report for GB Application No. 1903269.7, Sep. 4, 2019.

IPO, Search Report for GB Application No. 1908867.3, Oct. 17, 2019.

UKIPO, Examination Report for UK Application No. 1908867.3, Mar. 17, 2020.

\* cited by examiner

SURFACE-MOUNTED ELECTRONIC APPARATUS

CROSS-REFERENCE TO RELATED APPLICATIONS

This application is a U.S. National Stage entry under 35 U.S.C. § 371 of International Application No. PCT/GB2020/050584, filed Mar. 11, 2020, which claims priority to U.K. Patent Application No. 1908867.3, filed Jun. 20, 2019, and U.K. Patent Application No. 1903269.7, filed Mar. 11, 2019, the entire disclosures of which are incorporated by reference herein.

FIELD OF THE DISCLOSURE

The present invention is concerned with a surface-mounted electronic apparatus. More specifically, the present invention is concerned with an apparatus configured to be mounted to a wall proximate a power outlet, and either (i) support and charge a mobile device such as a cellular phone or tablet or (ii) play audio through an in-built speaker.

BACKGROUND OF THE DISCLOSURE

Cellular phones and tablet computers are in common use. One of the features common to all such devices is the need to charge the batteries of such devices on a regular basis. Whilst all mobile devices can be charged by plugging in a charger (comprising a plug, transformer, lead and charging plug), most modern devices can be inductively charged. Inductive charging involves the positioning of the device proximate a charging electromagnetic field. The charging field is created by a primary charging coil (in place of a charging plug). A secondary coil within the device is able to convert the energy of the electromagnetic field into an electrical current to charge the device's battery. All that is required is proximity (typically in the order of mm) between the primary and secondary coils.

There are two main standards of inductive charging used on such devices-Qi and PMA. Both operate in the manner described above, but at different frequencies. Most modern mobile devices use the Qi standard.

Inductive chargers typically comprise a mains plug, transformer (typically integrated with the plug), cable and charging plate. The charging plate comprises the primary coil, and in use the mobile device is positioned on the plate to charge.

A first problem with such devices is that they are only marginally more convenient than plugging the device in with a charging plug. Inductive chargers still need to be plugged into a plug socket, and still leave a trailing cable which can be unsightly.

A further problem is that accurate positioning of the mobile device on the charging plate is required to ensure the "handshake" such that charging can begin. It is easy to misalign the mobile device and plate such that the device does not charge. It is also easy to knock the device from the plate.

A still further problem is that charging plates are typically horizontal in use and positioned on a worktop. This makes viewing the screen awkward during charging.

There have been attempts to overcome these problems.

CN207765722U discloses a charging equipment rack in which a frame is assembled with a wall outlet (socket). A support member is connected to the frame, which support member is configured to support and hold a device for charging via the socket. An opening is provided in the support member for connection of a charging cable to the charging socket/port of a mobile device.

This device still requires the user to manually plug the device in, and in doing so undertake the tricky task of feeding the cable through the opening. The charging cable will still need to trail from the plug to the device. Further, because the device is supported in a vertical orientation, there is a requirement to "clamp" it in position with a clamp arm which (i) may not securely clamp all thicknesses of device and (ii) will obscure the screen on modern devices which have a very thin or no bezel. Still further, because the frame is an endless loop, the installer is required to remove and disconnect the plug socket wall plate in its entirety to enable the power cables to be fed through the frame. This would typically require a qualified electrician.

CN104883423A also discloses a charging rack for a mobile device which can be held between a charger plug and a socket, and used to support a mobile device during charging.

This has the same drawbacks in terms of the training cable, and the need to clamp the device means that it's screen will be partially obscured. The need to clamp the "hook" portion between the plug and socket also means that the plug is not properly engaged in the socket. This is problematic from a safety perspective, as well as providing some risk that the plug may not make an adequate connection within the mains socket.

Home speakers with the ability to stream music over a wireless technology such as Bluetooth (RTM) or Wi-Fi are increasingly popular. Such devices can stream audio content (such as music, radio stations, podcasts etc.) from a mobile device or directly over the internet from various online streaming services. Home speakers which can accept voice commands and react appropriately (so-called "smart speakers") are also increasingly common, most of which feature "digital assistants" such as Siri (RTM) and Alexa (RTM).

Many Bluetooth (RTM) speakers and smart speakers are table-top devices. Devices such as the Amazon Echo (RTM) series, the Apple HomePod (RTM) and Google Home (RTM) are typically plugged into a wall socket and are designed to rest on a flat horizontal surface nearby.

A problem with such devices is that they consume space on the surface. Smaller devices have been proposed, but small form factors generally demand a trade-off with speaker size and therefore sound quality.

Therefore like known induction charging plates, such devices can be inconvenient to use.

It is an aim of the invention to overcome, or at least mitigate, the above problems.

SUMMARY OF THE DISCLOSURE

According to a first aspect of the invention there is provided an electronic device mounting apparatus comprising:
  a housing having:
    a mounting portion configured to be at least partially received between a plug socket wall plate and an associated wall; and,
    a support portion connected to the mounting portion such that the support portion covers the plug socket wall plate:
  an electronic device mounted on the support portion, the electronic device comprising a plug for powering the electronic device, the plug being engageable with the plug socket in use such that the plug is covered by the housing.

Advantageously, providing a support portion which covers the plug socket(s) in use provides several advantages. Firstly, the housing can be used to conceal the cables of the device(s). Secondly, because plug sockets are typically wall-mounted, the support portion is configured to support the device in a substantially upright position (i.e. either vertical or at another suitable near-vertical angle).

The electronic device may be a speaker facing outwardly from the support portion. Advantageously, the upright position of the support portion means that sound is transmitted outwardly towards the user.

Preferably the mounting portion is an inwardly projecting flange of the housing.

Preferably the mounting portion has an open profile in at least one condition of the apparatus.

Preferably the mounting portion comprises a cross-member and two side members extending normal to the cross-member to define an inverted U-shaped mounting portion in use.

Preferably the speaker support portion is inclined at an upward angle between 1 and 45 degrees to the vertical in use.

Preferably the speaker support portion is inclined at an upward angle between 1 and 10 degrees to the vertical in use.

The invention also provides a method of installing an audio device according to the first aspect, comprising the steps of:
providing a plug socket installed on a wall, the plug socket having a back plate:
loosening the back plate to move the back plate away from the wall;
inserting the mounting portion between the back plate and the wall;
tightening the back plate to sandwich the mounting portion between the back plate and the wall;
placing the support portion over the plug socket.

The electronic device may be a charger comprising a plug and a power output device, the power output device configured to charge a device supported on the support portion when the plug is engaged with the plug socket.

The electronic device may be a charger comprising a plug and a power output device, the power output device configured to charge a device supported on the support portion when the plug is engaged with the plug socket.

Preferably the mounting portion is an inwardly projecting flange of the housing.

Preferably the mounting portion has an open profile in at least one condition. What we mean by this is that the apparatus may have an "installation condition" in which part of the apparatus is removed in order to provide an open profile to enable it to be slid between a wall plate and wall without removed/unwiring of the wall plate. More preferably the mounting portion comprises a cross-member and two side members extending normal to the cross-member to define an inverted U-shaped mounting portion in use. Advantageously this allows the apparatus to be slid between a wall plate and the wall without needing to feed power cables through an endless loop, as in CN207765722U.

Preferably the support portion comprises a flat planar portion for supporting a mobile device.

Preferably the support portion is inclined at an angle between 1 and 45 degrees to the vertical in use. More preferably the support portion is inclined at an angle between 1 and 10 degrees to the vertical in use.

Preferably the support portion comprises a lip configured to support an edge of a mobile device in use.

Preferably the power output device comprises an inductive charger primary coil, which primary coil is positioned adjacent the support portion to charge a mobile device supported thereon.

Preferably wherein the power output device comprises a charging plug for a mobile device.

Preferably an opening is provided in the housing through which the charging cable passes.

Preferably the support portion comprises a lip for supporting a mobile device, which lip comprises a recess to accommodate the charging plug and/or cable when a mobile device is so supported.

Preferably the charger comprises a cable between the plug and the power output device, the power output device comprises a charger plug for a mobile device and comprising a cable retractor configured to retract the cable within the housing.

Preferably the support portion is configured to support a first device for inductive charging using the primary coil, and a second device for charging using the charger plug.

According to a second aspect of the invention there is provided a method of installing a charging apparatus according to the first aspect, comprising the steps of:
providing a plug socket installed on a wall, the plug socket having a back plate:
loosening the back plate to move the back plate away from the wall;
inserting the mounting portion between the back plate and the wall;
tightening the back plate to sandwich the mounting portion between the back plate and the wall;
placing the support portion over the plug socket.

Preferably the mounting portion has an open profile to enable it to be slid between the back plate and the wall.

BRIEF DESCRIPTION OF THE DRAWINGS

Example apparatuses according to the invention will now be described with reference to the accompanying Figures in which.

DETAILED DESCRIPTION OF THE DISCLOSURE

First Embodiment

Figure 1:
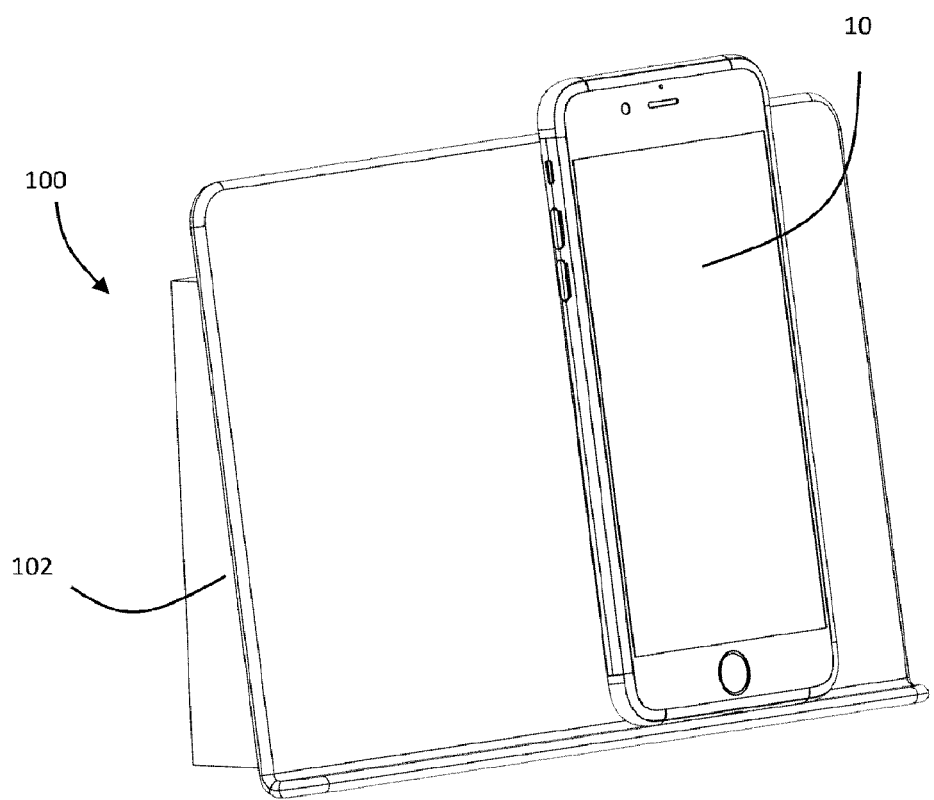
FIG. 1 is a front perspective view of a first charging apparatus according to the present invention.
Figure 2:
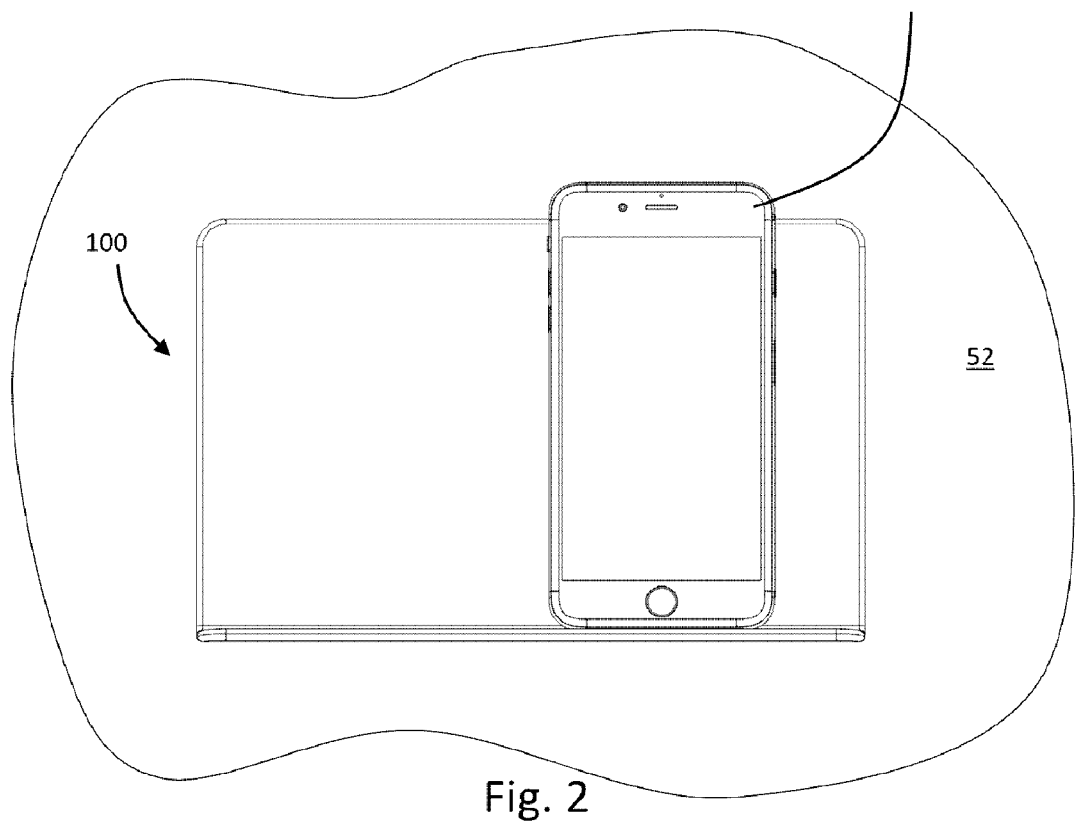
FIG. 2 is a front view of the charging apparatus of FIG. 1.

Referring to FIG. 1, a charging apparatus 100 according to the present invention is shown. A mobile device in the form of a cellular phone 10 is supported by the apparatus as will be described below. The apparatus is mounted to a plug socket 50 which in turn is mounted to a wall 52. A pair of chargers 54, 56 are provided.

The apparatus 100 comprises a housing 102. The housing 102 comprises sidewalls 104, 106, top wall 108, bottom wall 110, mounting plate 112 and support 114.

The sidewalls 104, 106 are mirror images of each other. As such only the sidewall 104 will be described in detail.

Figure 4:
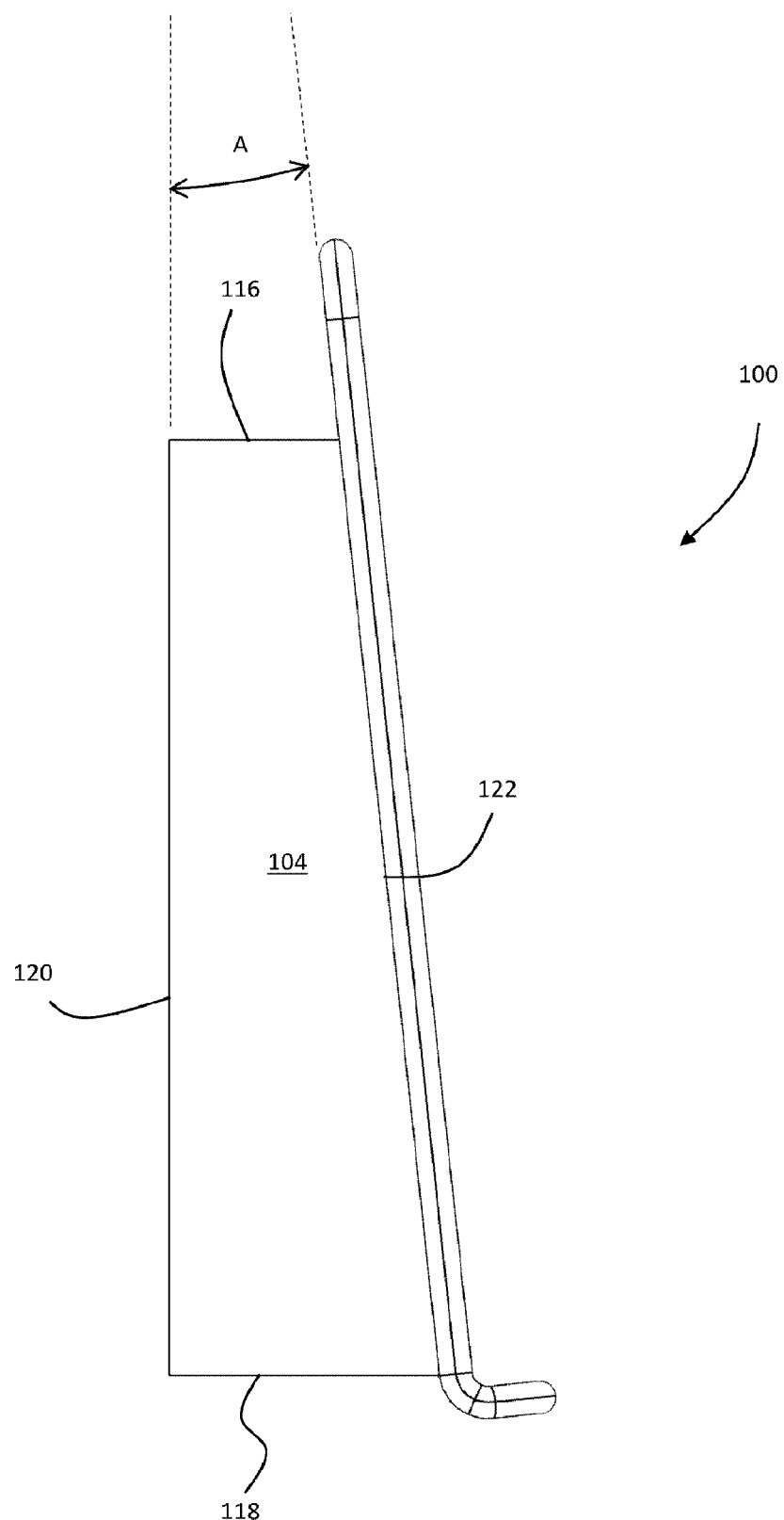
FIG. 4 is a side view of the charging apparatus of FIG. 1.
Figure 5:
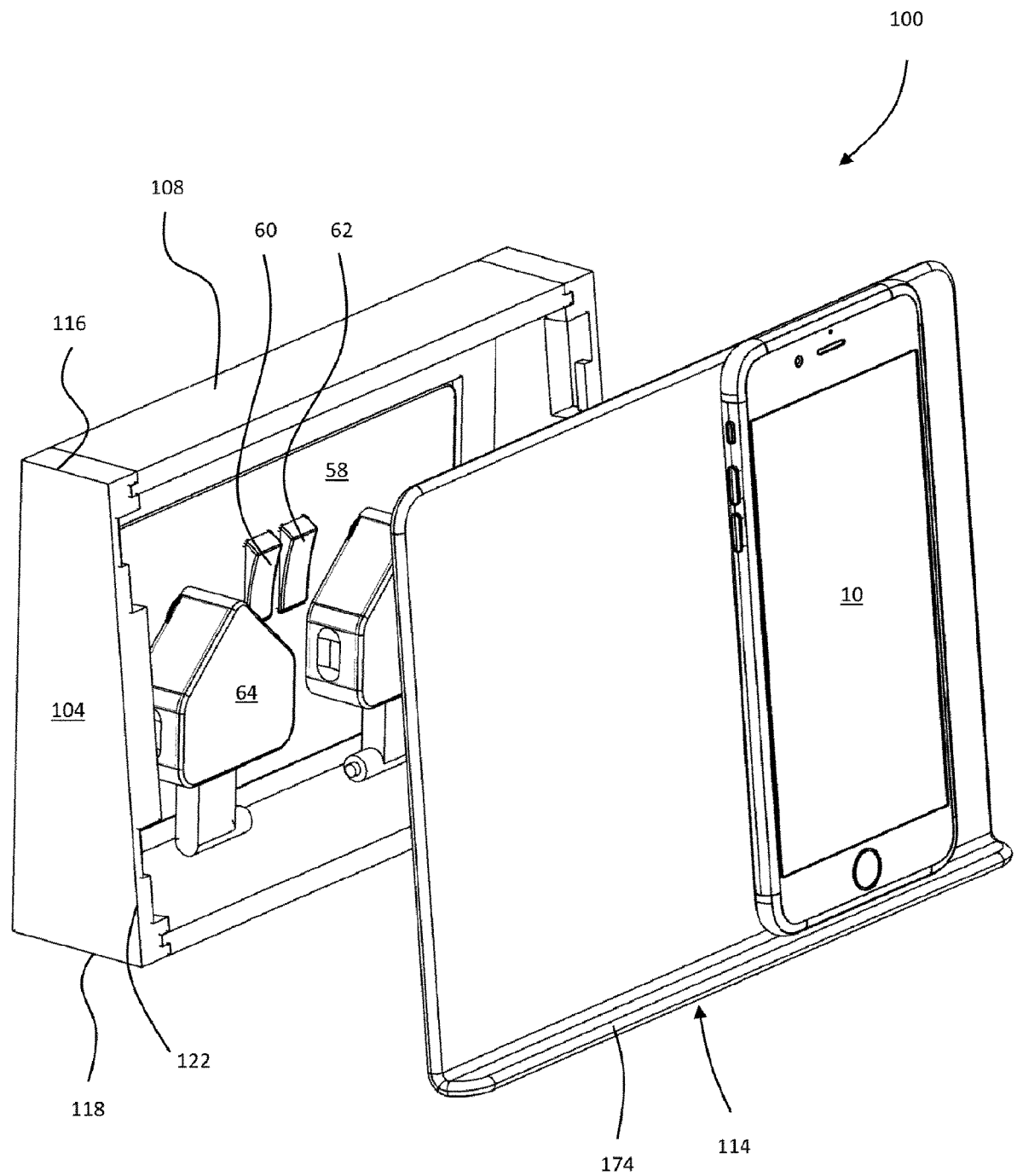
FIG. 5 is an exploded view of the charging apparatus of FIG. 1.
Figure 7:
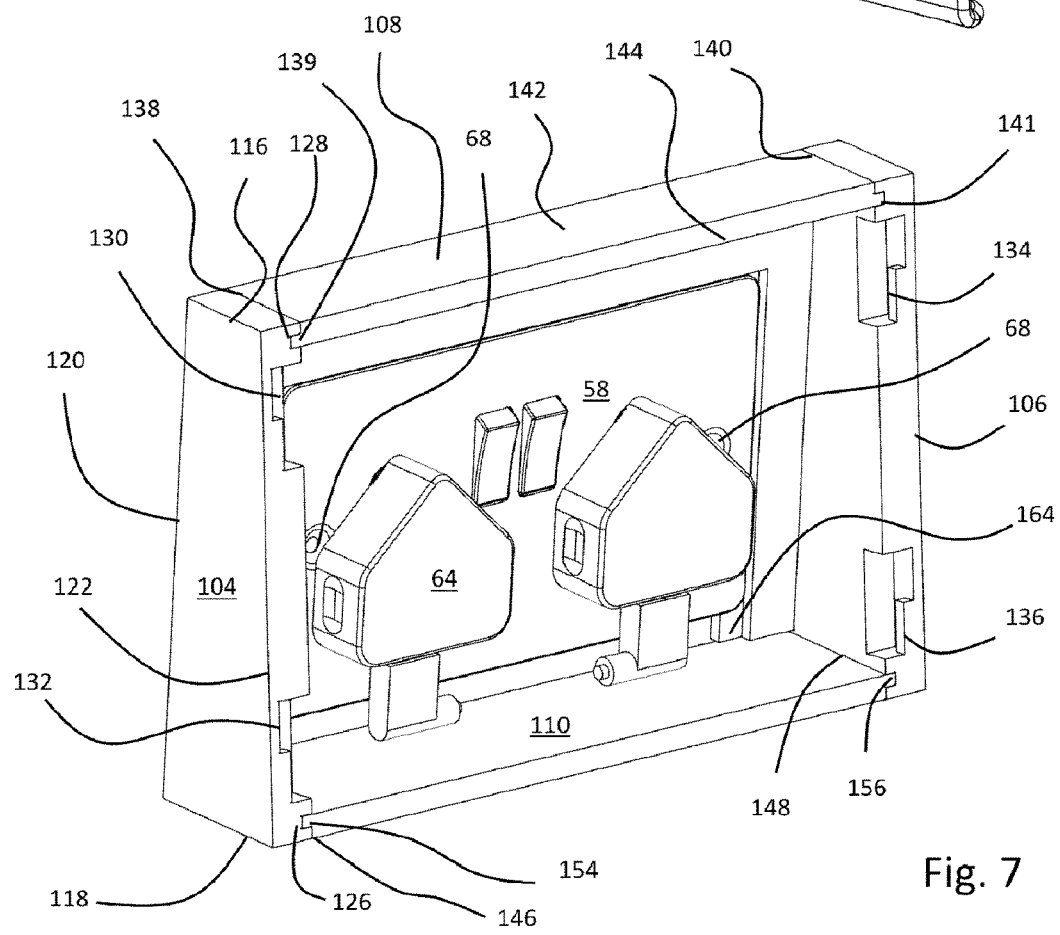
FIG. 7 is a front perspective view of a part of the charging apparatus of FIG. 1.

The sidewall 104 is generally flat and quadrilateral in shape. From the side (FIG. 4), it is trapezoidal having a top edge 116, bottom edge 118, rear edge 120 and a front edge 122. The top and bottom edges 116, 118 are parallel, and the rear edge normal thereto. The front edge 122 is at an angle A to the rear edge 120. The sidewall 104 defines a channel 126 at a lower end, proximate the bottom edge 118. The sidewall 104 comprises an upper channel 128 proximate the top edge 116. The sidewall further defines first and second spaced apart mounting slots 130, 132 on the front edge 122. Each mounting slot 130, 132 defines a respective undercut portion 134, 136 (shown on wall 106 in FIG. 7 for clarity).

The top wall 108 is generally flat, elongate and rectangular comprising a first side edge 138, second side edge 140, rear edge 142 and front edge 144. The first and second side edges 138, 140 comprise respective projections 139, 141.

The bottom wall 110 comprises a first side edge 146, second side edge 148, rear edge 150 and front edge 152. The first and second side edges 146, 148 comprise respective projections 154, 156.

Figure 3:
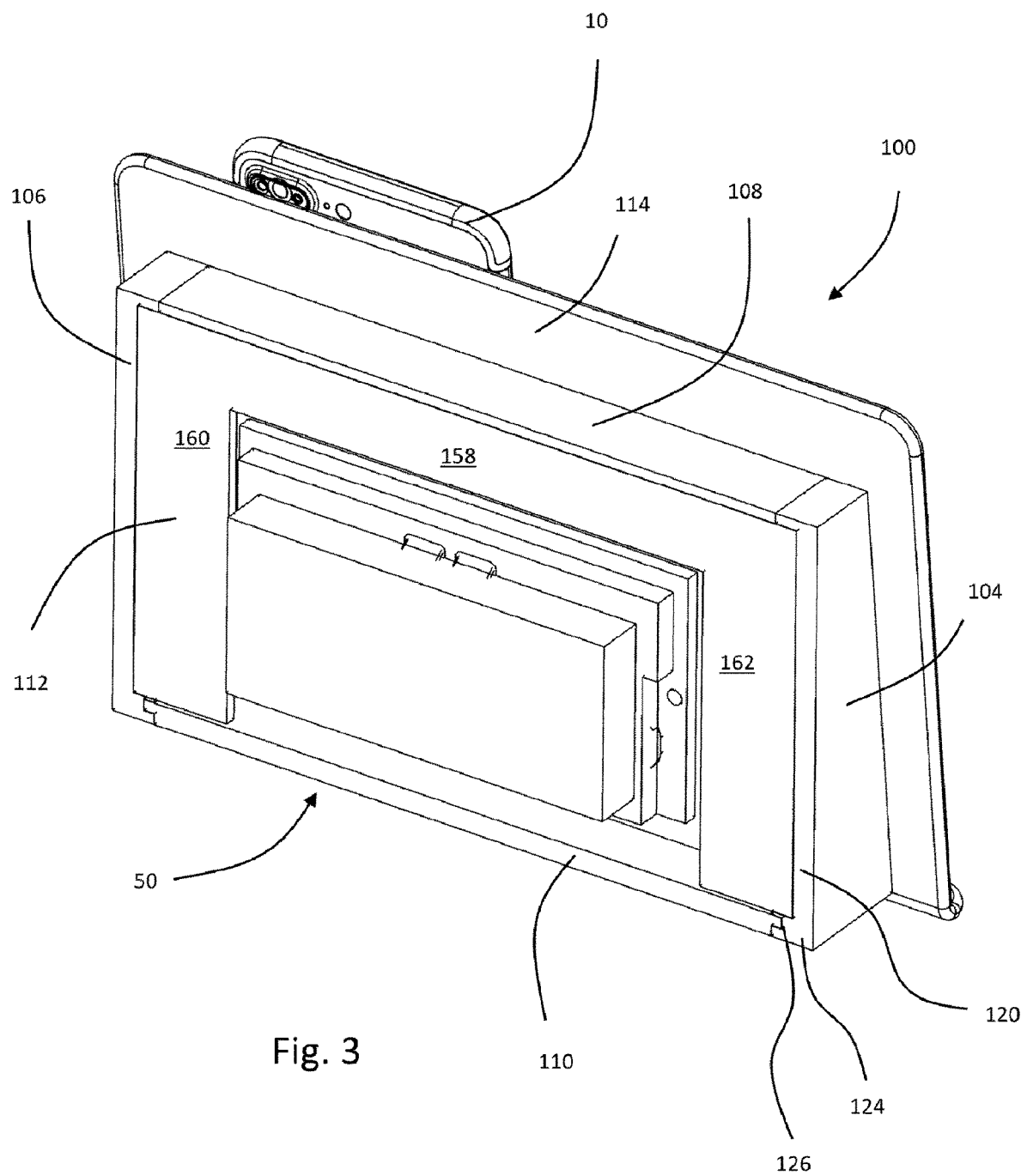
FIG. 3 is a rear perspective view of the charging apparatus of FIG. 1.

The mounting plate 112 (FIG. 3) is flat and generally in the shape of an inverted "U" having a cross-member 158, and first and second side members 160, 162. A mounting flange 164 extends in a "U" shape around the inner periphery of the mounting plate 112.

The support 114 is generally planar having a top edge 166, bottom edge 168 and side edges 170, 172. A support lip 174 extends from the plane of the support 114 along the bottom edge 168. On the rear face of the support 114 there is provided a frame 176 being generally rectangular in shape defining a charging plate recess 178. The frame 176 defines four tabs 180, 182, 184, 186 at each corner.

The socket 50 is a standard 2-gang plug plate which is well known in the art. It comprises a wall plate 58, a pair of switches 60, 62 attached to the plate 58 and a pair of socket openings (not visible). The wall plate 58 attaches to a back box (not shown) embedded in the wall 52 such that (without the apparatus 100) the plate 58 abuts the wall. The plate 58 is secured by screws provided in fixing bores 68.

Figure 6:
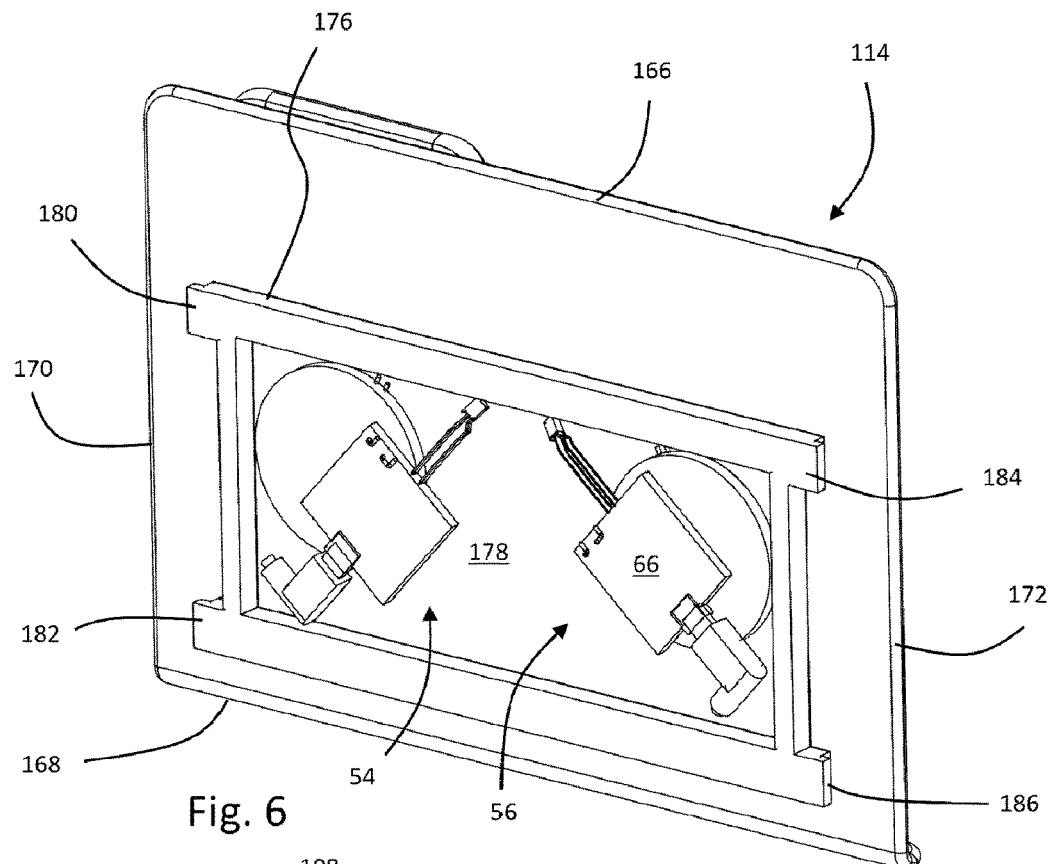
FIG. 6 is a rear perspective view of a part of the charging apparatus of FIG. 1.

The chargers 54, 56 identical and are of a known type. Each comprises a charger plug 64 connected to an inductive charging plate 66 via a cable (not shown). Each of the charging plates 66 is positioned within the charging plate recess 178 against the support 114 in a side by side relationship (FIG. 6).

It will be noted that the drawings show a 2-gang UK 3-pin plug arrangement, but the present invention is also adaptable to 1-gang UK 3-pin, European, US or other types of plug and socket arrangement as required. It is also envisaged that instead of a mains power plug, a USB (Universal Serial Bus) cable could provide power to the charging plates via a socket comprising USB power output.

The sidewalls 104, 106, the top wall 108 and the mounting plate are constructed as a unitary component. Alternatively, the sidewalls 104, 106 and the top wall 108 may be constructed from separate components and assembled by engaging each projection 139, 141 into the upper channel of a sidewall 104, 106. The mounting plate is then attached to the back of this U-shaped arrangement.

To install the apparatus 100, the plug socket 50 is moved away from the wall by a small distance (say 4-5 mm) by partially unscrewing the plate 58 and pulling it away from the wall. The assembled sidewalls 104, 106, top wall 108 and mounting plate 112 (having an open or U-shaped profile) are then slid in a downward direction relative to the socket 50 such that the flange 164 enters the gap between the plate 58 and the wall 52. The socket 50 is then tightened against the wall by screwing the plate 58 inwards to clamp the flange 164, and hence the apparatus against the wall.

The bottom wall 110 is then installed by sliding the projections 154, 156 into respective channels 126 in the side walls 104, 106. At this point, the charger plugs 64 can be placed into the socket 50, and the support 114 assembled with the rest of the apparatus 100. This occurs by aligning the tabs 180, 182, 184, 186 with the mounting slots 130, 132 and sliding the support 114 in a downward direction to engage the undercut portions 134, 136.

Once in position, when a phone 10 is positioned on the support 114, resting on the lip 174, it is brought into range of one of the charging plates 66 and is able to charge. It should also be noted that the support 114 is oriented at angle A, which at 6 degrees is sufficient to ensure that the device 10 does not fall from the support, but the screen can be easily viewed.

Second Embodiment

Figure 8:
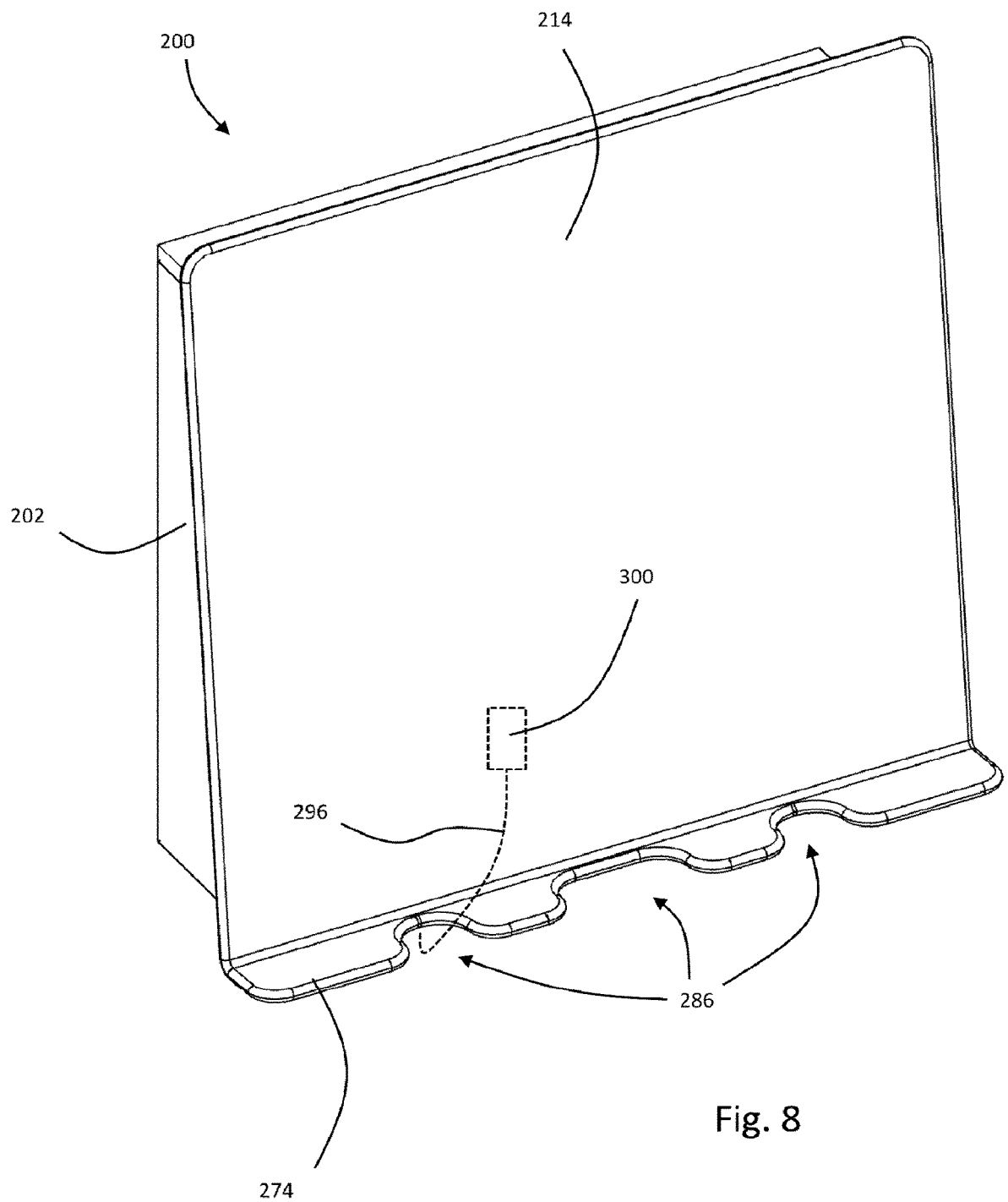
FIG. 8 is a front perspective view of a second charging apparatus according to the present invention.

Referring to FIG. 8, a charging apparatus 200 according to the present invention is shown. The device 200 is very similar to the device 100, and as such reference numerals for common or similar features will be incremented by 100.

As with the apparatus 100, the apparatus 200 is mounted to a plug socket which in turn is mounted to a wall. A pair of chargers are provided.

The apparatus 200 is primarily designed for charging larger electronic devices such as tablet computers. As such, it is generally larger (to enable the support 214 to be larger to support a larger device). It is also provided with a deeper lip 274 having a plurality of cut outs or notches 286 to receive charging cables. Most tablet computers do not feature an inductive charging capability, and as such the apparatus 200 is provided with plug-type charging. Instead of the inductive chargers provided with the apparatus 100, the apparatus 200 features a cable retractor 288 (FIG. 9) within the housing. The cable retractor comprises a moveable pulley 290 mounted in a carriage 292 The carriage is configured to move in a vertical direction D against the bias of a spring (not shown). A static pulley 294 is positioned above the moveable pulley 290. A charging cable 296 is provided having a first end connector 298 for connection to a plug in the socket to which the apparatus 200 is mounted. The cable has a second end 300 for connection to a tablet computer, phone or other electronic device. The cut outs 286 allow the devices to be positioned on the lip 274 and the charging connection (usually located at the bottom edge of such devices) accessed.

The cable retractor is configured to allow the cable 296 to be pulled from an opening 302 in the bottom of the housing 212 for plugging into a device. As the cable 296 is pulled, the moveable pulley 288 moves against the bias of the spring in the direction D. The moveable pulley 288 is lightly biased by the spring such that the second end 300 remains in position when plugged in. When unplugged, the spring retracts the cable into the housing.

Figure 9:
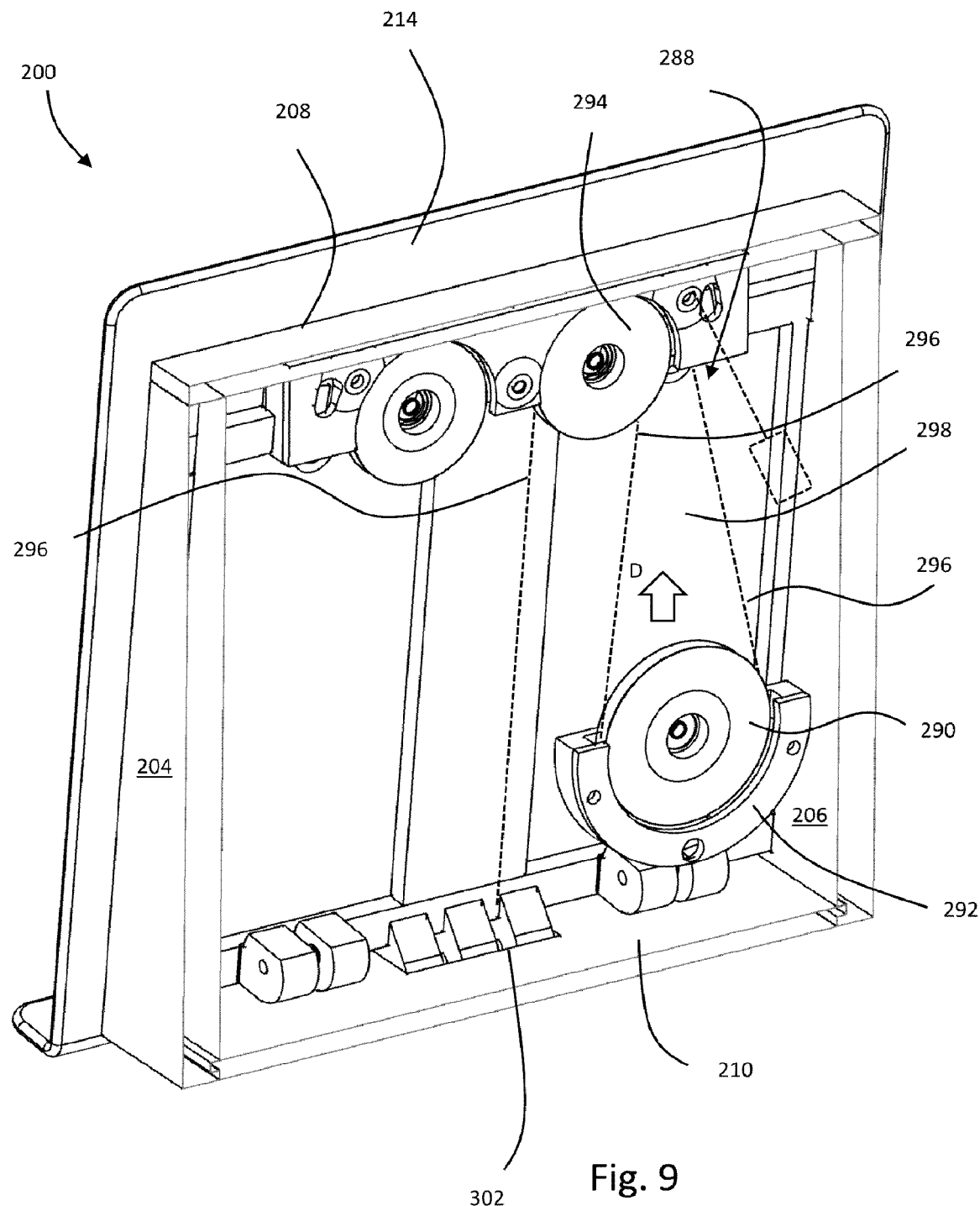
FIG. 9 is a rear perspective, section view of the apparatus of FIG. 8.
Figure 10:
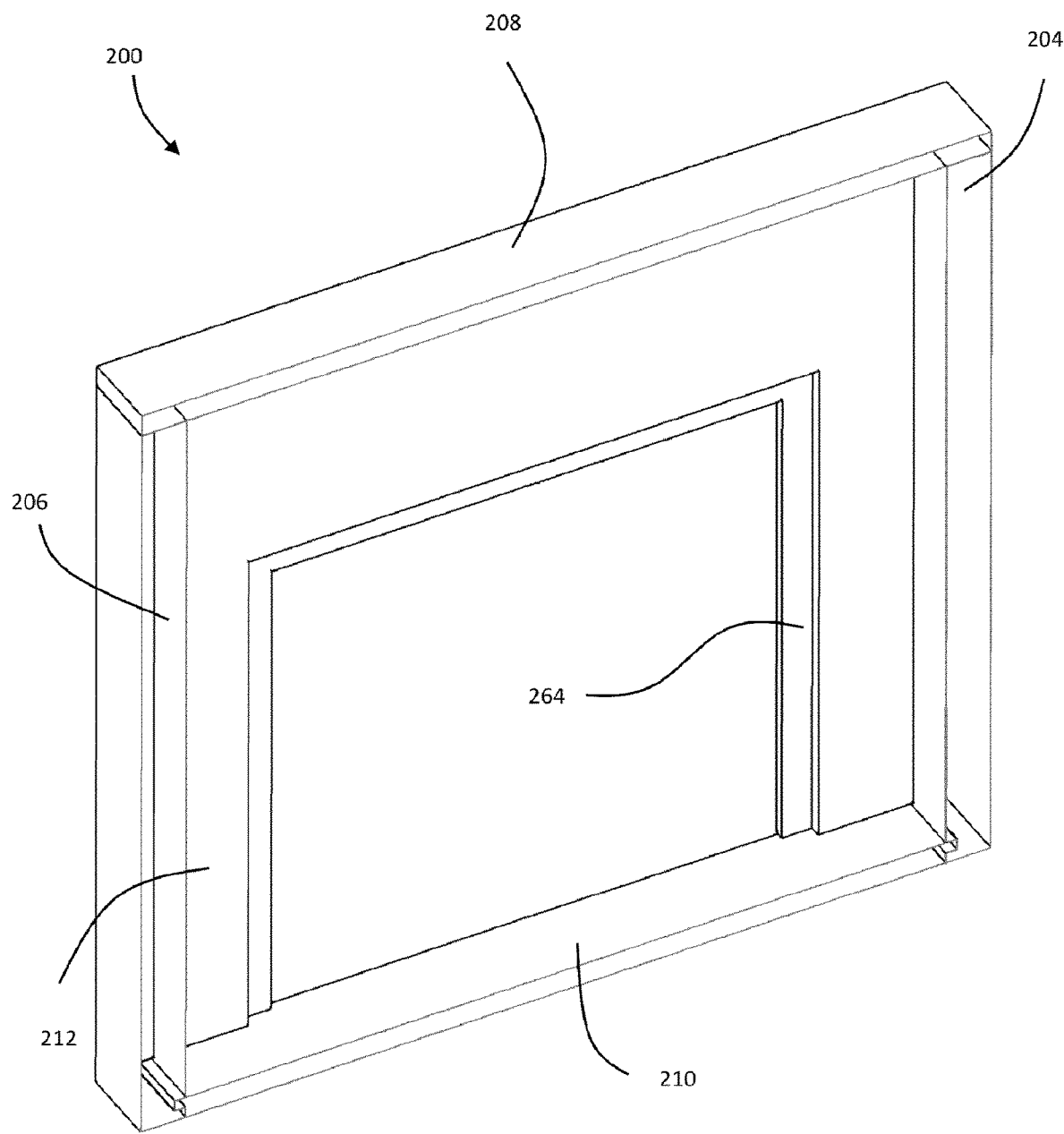
FIG. 10 is a front perspective section view, opposite to FIG. 9.

As shown in FIG. 9, the retractor 288 is mounted to the support 214 and to the top wall 208. The support 214, top wall 208 and retractor 288 are pre-assembled as a unit. The sidewalls 204, 206, bottom wall 210 and the mounting plate 212 are also assembled together (or formed as a unitary component). The assembled sidewalls 204, 206, bottom wall 210 and the mounting plate 212 are attached to the socket as described above, and the assembled retractor 288, support 214 and top wall 208 are subsequently assembled with them to form the apparatus 200.

It will be noted that because the apparatus has a condition in which the mounting portion has an open or U-shaped profile, it can be installed by a lay person. In other words, the installer does not need to completely remove the wall plate in order to install the device.

Third Embodiment

Figure 11:
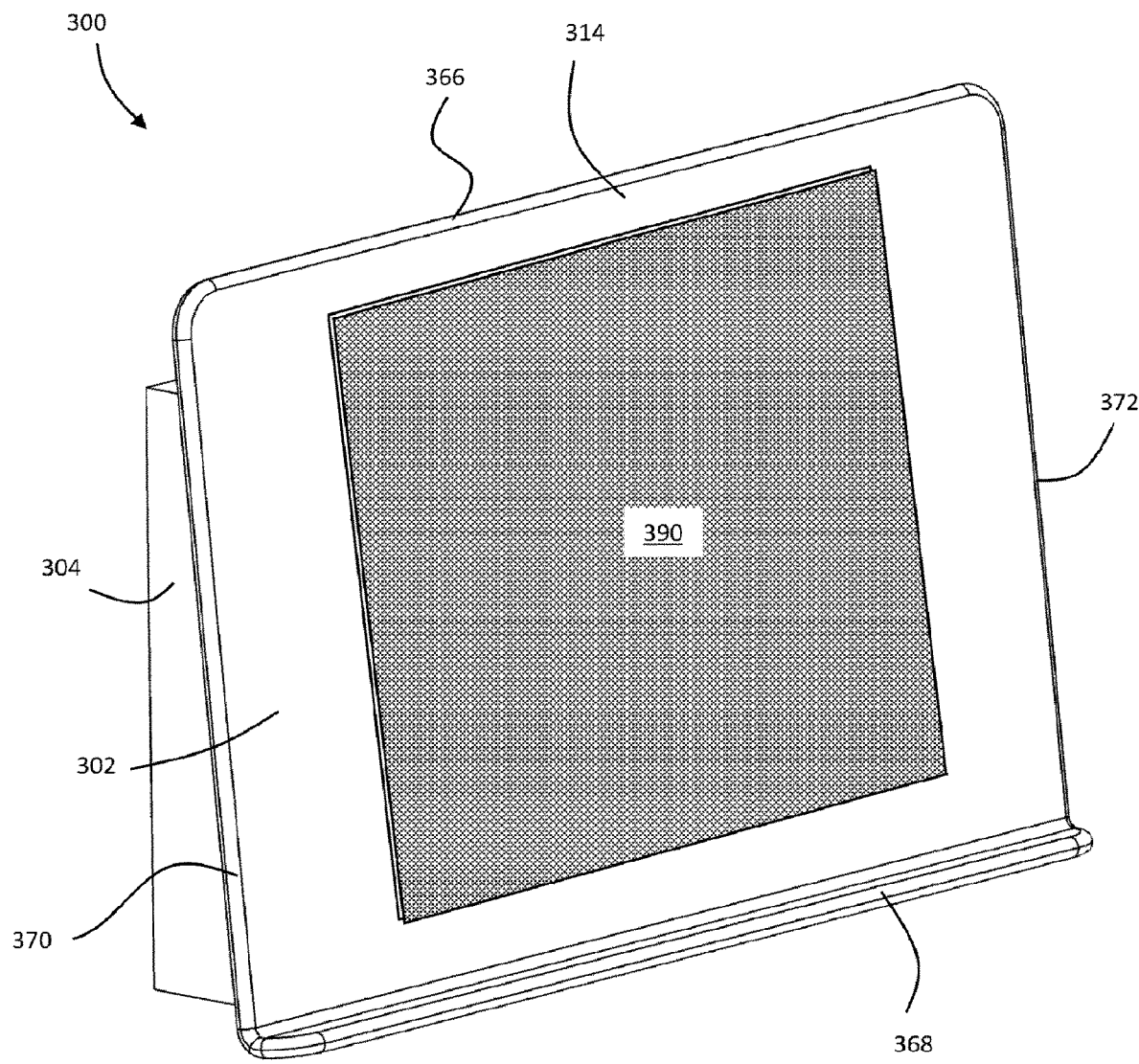
FIG. 11 is a front perspective view of an audio device according to the present invention.
Figure 12:
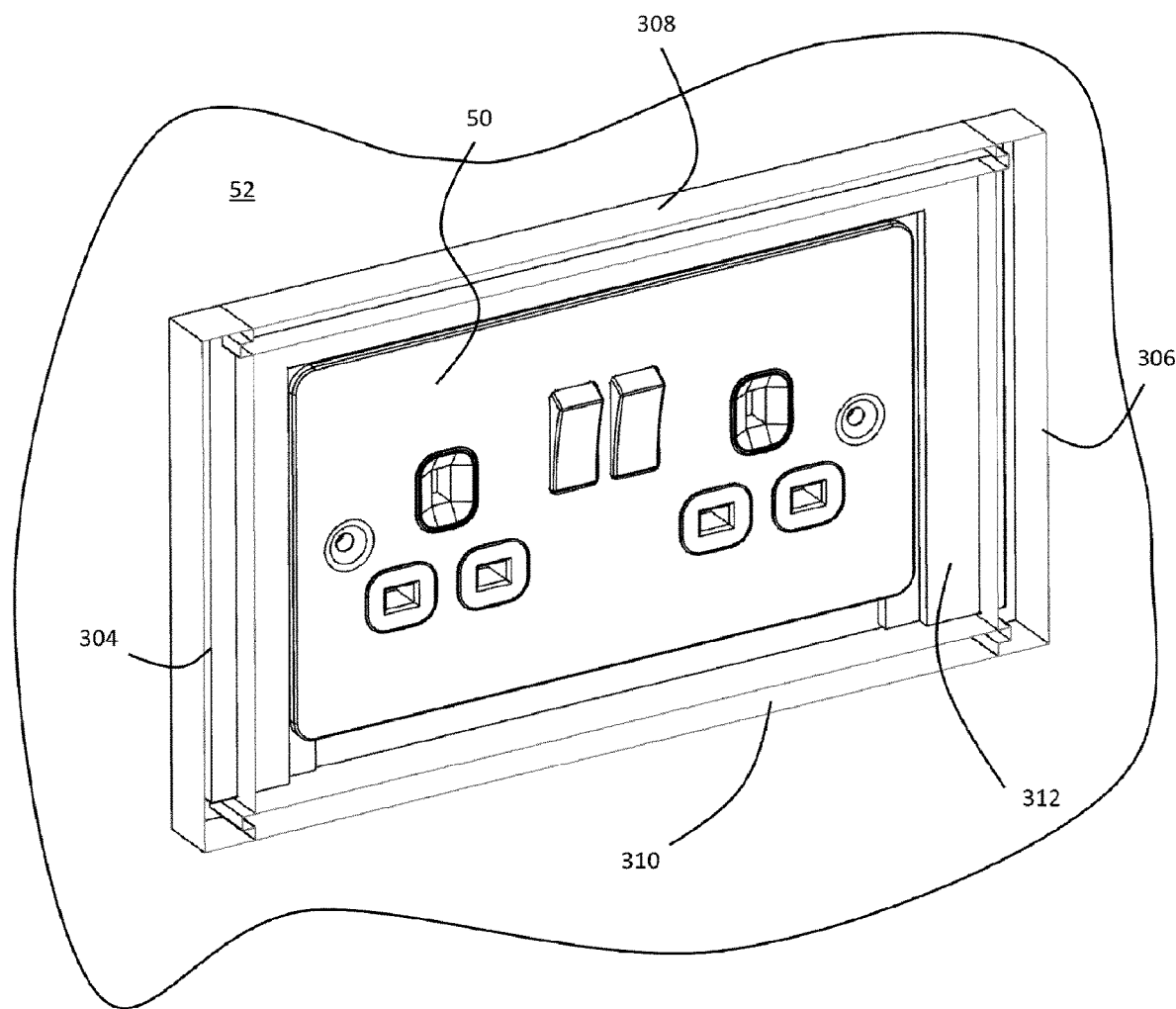
FIG. 12 is a front perspective section view of the audio device of FIG. 11.
Figure 13:
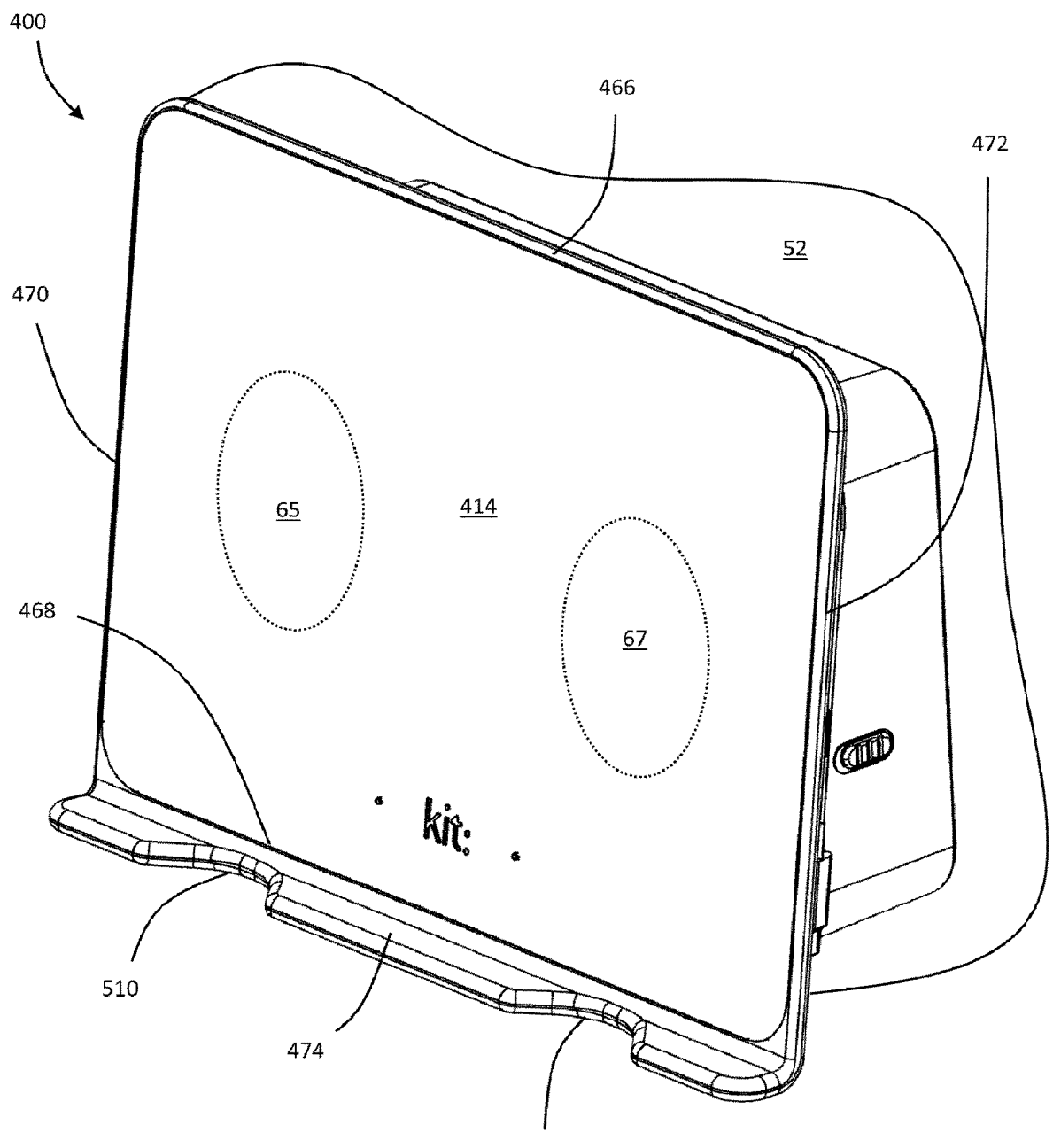
FIG. 13 is a perspective view of a third charging apparatus according to the present invention.
Figure 14:
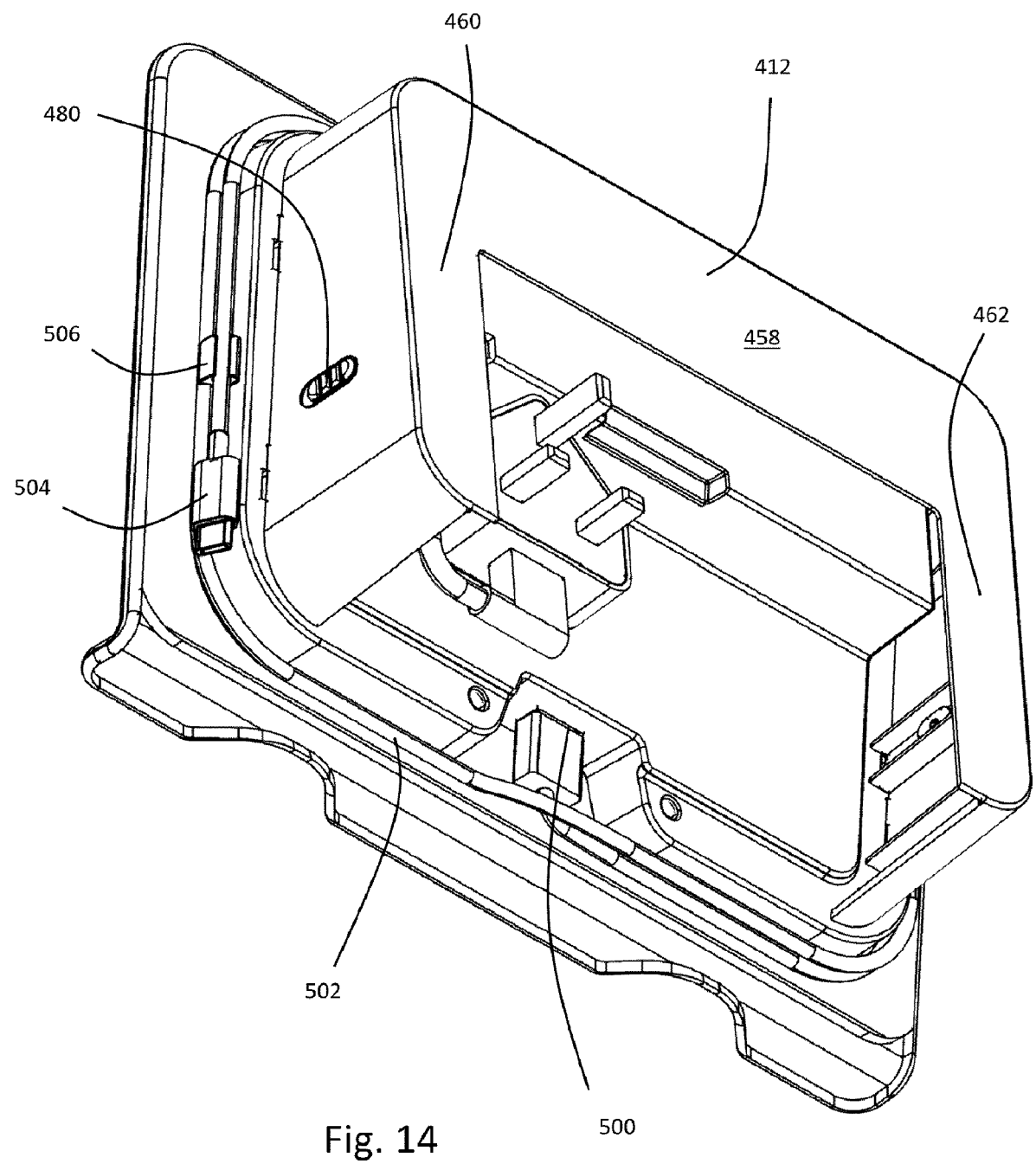
FIG. 14 is a perspective rear view of the apparatus of FIG. 13.
Figure 15:
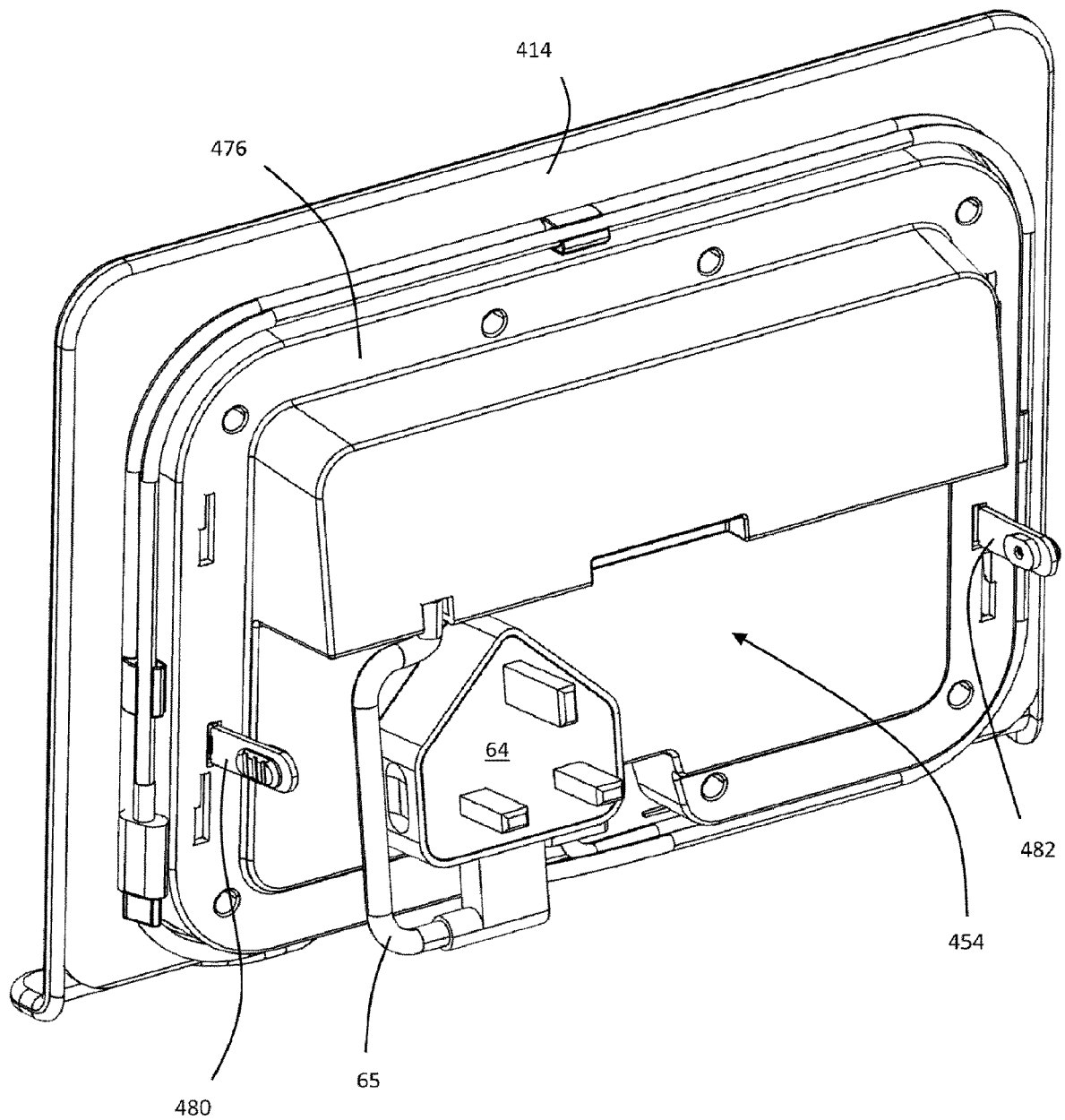
FIG. 15 is a perspective rear view of the apparatus of FIG. 13 with some components removed; and, FIG. 16 is a perspective front view of the apparatus of FIG. 13 with some components removed; and, FIG. 17 is a perspective section through plane XVII in FIG. 16.
Figure 16:
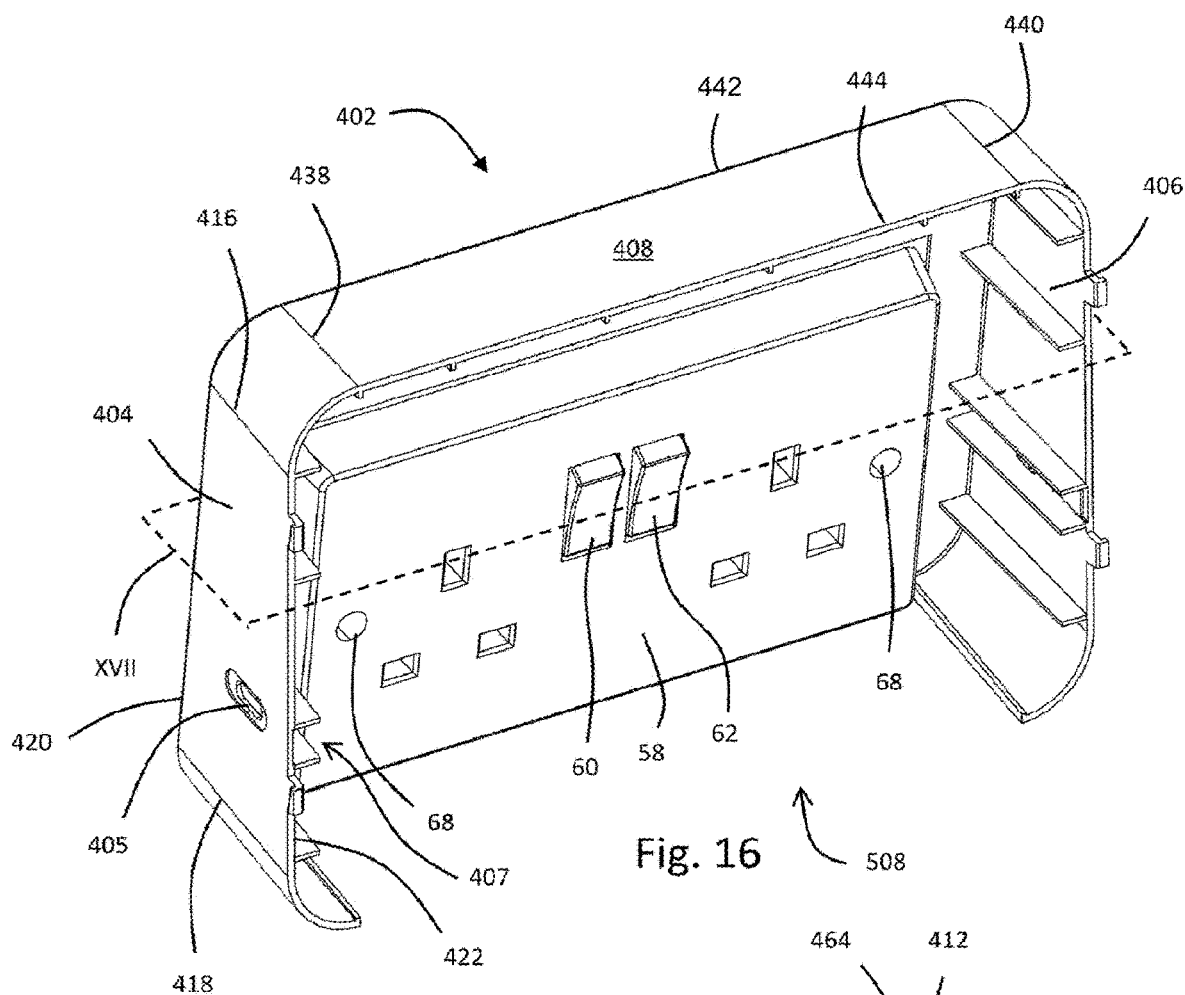
Figure 17:
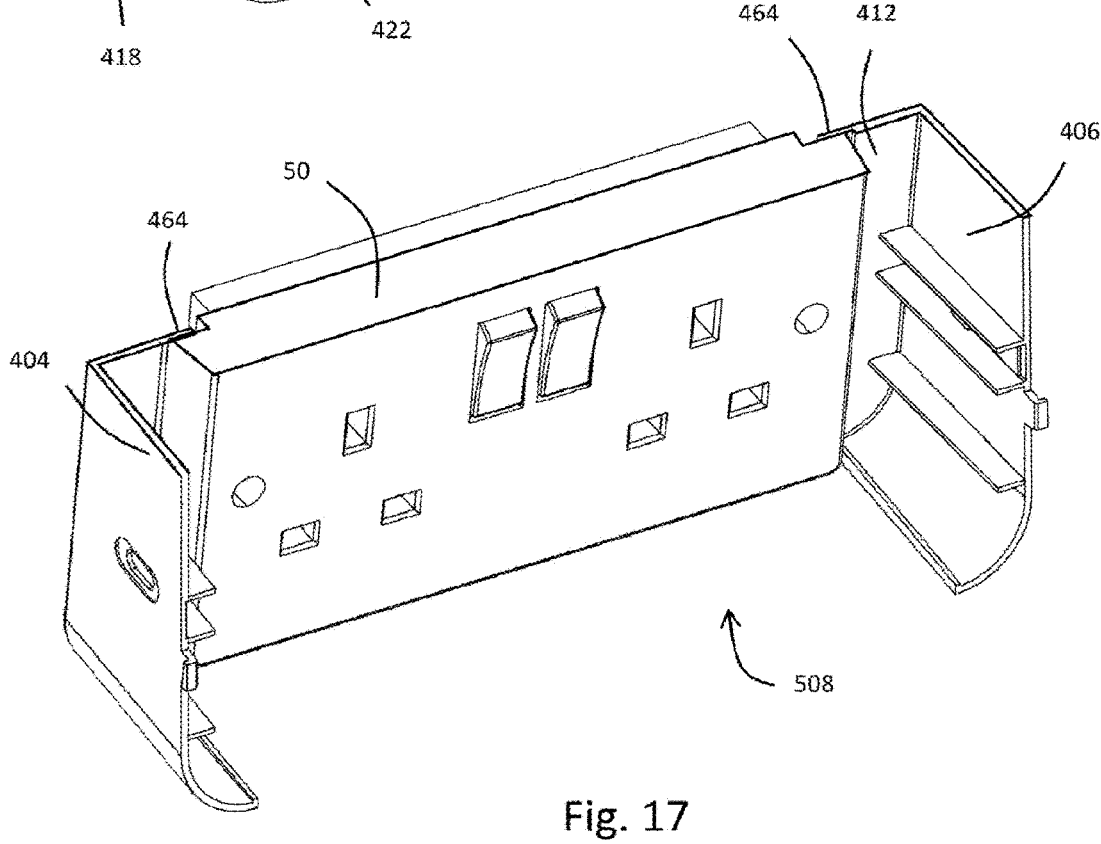

Referring to FIG. 11, an audio apparatus 300 according to the present invention is shown. The apparatus 300 is mounted to a plug socket 50 which in turn is mounted to a wall 52.

The apparatus 300 comprises a housing 302. The housing 302 is similar to the housing 102 of the first embodiment, having sidewalls 304, 306, top wall 308, bottom wall 310, mounting plate 312 and speaker support 314. The construction of the sidewalls 304, 306, top wall 308, bottom wall 310 and mounting plate is identical to those of the first embodiment, and features will be referred to with reference numerals 200 greater.

The speaker support 314 is generally planar having a top edge 366, bottom edge 368 and side edges 370, 372. As with the support 114, on the rear face of the support 314 there is provided a frame with tabs at each corner (not visible).

The speaker support 314 is configured to hold a speaker 390 in the manner shown in FIG. 11. The speaker 390 is configured such that sound propagates outwardly from the apparatus 300, generally away from the socket 50 and wall 52. The speaker is not shown in detail, but is understood to be a smart speaker having a power supply with a plug which can be assembled with the socket 50 to thereby power the speaker.

The socket 50 is as described in the first embodiment.

It will be noted that the drawings show a 2-gang UK 3-pin plug arrangement, but the present invention is also adaptable to 1-gang UK 3-pin, European, US or other types of plug and socket arrangement as required. It is also envisaged that instead of a mains power plug, a USB (Universal Serial Bus) cable could provide power to the speaker via a socket comprising USB power output.

As with the apparatus 100, to install the apparatus 300, the plug socket 50 is moved away from the wall by a small distance (say 4-5 mm) by partially unscrewing the plate 58 and pulling it away from the wall. The assembled sidewalls 304, 306, top wall 308 and mounting plate 312 (having an open or U-shaped profile) are then slid in a downward direction relative to the socket 50 such that the flange enters the gap between the plate 58 and the wall 52. The socket 50 is then tightened against the wall by screwing the plate 58 inwards to clamp the flange 164, and hence the apparatus against the wall.

The bottom wall 310 is then installed per the first embodiment. At this point, the speaker plug can be placed into the socket 50, and the support 314 carrying the speaker 390 assembled with the rest of the apparatus 300. This occurs by aligning the tabs with the mounting slots and sliding the support 314 in a downward direction to engage the undercut portions, per the first embodiment.

Once in position, the speaker can be used as a wireless and/or smart speaker. The fact that (per FIG. 11) the support 314 is tilted upwards is beneficial in projecting sound towards the user's head (when standing or sitting at a table).

Fourth Embodiment

Referring to FIGS. 13 to 17, a charging apparatus 400 according to the present invention is shown. A mobile device in the form of a cellular phone (not shown) can be supported by the apparatus as with the first embodiment. The apparatus is mounted to a plug socket 50 which in turn is mounted to a wall 52. A single charger 454 is provided.

The apparatus 400 comprises a housing 402. The housing 402 comprises sidewalls 404, 406, top wall 408, mounting plate 412 and support 414.

The sidewalls 404, 406 are mirror images of each other. As such only the sidewall 104 will be described in detail.

The sidewall 404 is generally flat and quadrilateral in shape. From the side, it is tapered having a top edge 416, bottom edge 418, rear edge 420 and a front edge 422. The top and bottom edges 416, 418 are parallel, and the rear edge normal thereto. The front edge 422 is at an angle to the rear edge 420 such that the top edge 418 is shorter than the bottom edge 418. The sidewall 404 defines a tab opening 405 defined in a guide channel 407.

The top wall 408 is generally flat, elongate and rectangular comprising a first side edge 438, second side edge 440, rear edge 442 and front edge 444.

The mounting plate 412 is flat and generally in the shape of an inverted "U" having a cross-member 458, and first and second side members 460, 462. A mounting flange 464 extends in a "U" shape around the inner periphery of the mounting plate 412 and has a lower thickness than the mounting plate 412.

The support 414 is generally planar having a top edge 466, bottom edge 468 and side edges 470, 472. A support lip 474 extends from the plane of the support 414 along the bottom edge 468. The support lip 474 comprises two notched 510, 512. On the rear face of the support 414 there is provided a frame 476 being generally rectangular in shape defining a charging plate recess. The frame 476 defines two resilient cantilever tabs 480, 482 extending rearwardly therefrom on either side.

The socket 50 is a standard 2-gang plug plate which is well known in the art. It comprises a wall plate 58, a pair of switches 60, 62 attached to the plate 58 and a pair of socket openings. The wall plate 58 attaches to a back box (not shown) embedded in the wall 52 such that (without the apparatus 100) the plate 58 abuts the wall. The plate 58 is secured by screws provided in fixing bores 68.

The charger 454 has a single charger plug 64 powering two inductive charging plate regions 65, 67 via a cable 65. The charger 454 further comprises a USB output port 500 for connection of a suitable USB charging cable 502 having a plug 504 for e.g. a mobile device. The housing 402 comprises cable clips 506 spaced around the periphery, behind the support 414, to retain the cable 502.

It will be noted that the drawings show a 2-gang UK 3-pin plug arrangement, but the present invention is also adaptable to 1-gang UK 3-pin, European, US or other types of plug and socket arrangement as required. It is also envisaged that instead of a mains power plug, a USB (Universal Serial Bus) cable could provide power to the charging plates via a socket comprising USB power output.

The sidewalls 404, 406, the top wall 408 and the mounting plate 412 are constructed as a unitary component. There is no bottom wall in this embodiment-instead, an opening 508 is provided for access to the socket 50.

To install the apparatus 400, the plug socket 50 is moved away from the wall by a small distance (say 4-5 mm) by partially unscrewing the plate 58 and pulling it away from the wall. The assembled sidewalls 404, 406, top wall 408 and mounting plate 412 (having an open or U-shaped profile) are then slid in a downward direction relative to the socket 50 such that the flange 464 enters the gap between the plate 58 and the wall 52. The socket 50 is then tightened against the wall by screwing the plate 58 inwards to clamp the flange 164, and hence the apparatus against the wall.

At this point, the charger plugs 64 can be placed into the socket 50, and the support 414 assembled with the rest of the apparatus 100. This is achieved by pushing the support 414 onto the rest of the housing 402 from the front such that the tabs 480, 482, guided in the channels 407 snap into the openings 405. Removal is facilitated by depression of the tabs 480, 482 into the housing.

Once in position, when a phone is positioned on the support 414, resting on the lip 474, it is brought into range of one of the charging regions and is able to charge. It should also be noted that the support 414 is oriented at an angle, which at 6 degrees is sufficient to ensure that the device does not fall from the support, but the screen can be easily viewed.

Other devices can be charged with the cable 402—for example devices without wireless charging. Such devices can also rest on the lip 474, with the plug engaging one of the notches 510, 512 to ensure the device is stable.

Variations

Variations fall within the scope of the present invention. The cable retraction system of the second embodiment may be scaled down and used in the housing of the first. Similarly, the induction plates of the first embodiment may be used in the housing of the second.

The first and second embodiments may be combined to provide an apparatus which can charge devices by inductive charging OR cable-charging depending on user preference.

The apparatus may be adapted for any type of electronic device which requires charging, such as laptops, PDAs, portable games consoles, MP3 players, battery packs etc.

The third embodiment may be combined with the first, second or fourth embodiment. For example, the apparatus 300 may have a speaker which covers only a portion of a support portion, the other part of the support portion being assembled with an induction charger. Alternatively, or in addition, cable retractors may be provided within the apparatus 300 to allow devices to be charged via pull-out power cables (per the second embodiment).

The invention claimed is:

1. An electronic device mounting apparatus comprising:
 a housing having:
  a mounting portion configured to be inserted between a loosened plug socket wall plate and an associated wall, such that, when tightened, the mounting portion is parallel to, sandwiched between, and in contact with both the plug socket wall plate and the wall to support the electronic device mounting apparatus; and,
  a support portion connected to the mounting portion such that the support portion covers the plug socket wall plate;
 an electronic device mounted on the support portion, the electronic device comprising a plug for powering the electronic device, the plug being engageable with the plug socket in use such that the plug is covered by the housing.

2. An electronic device mounting apparatus according to claim 1 wherein:
 the electronic device is a charger comprising a plug and a power output device, the power output device configured to charge a device supported on the support portion when the plug is engaged with the plug socket.

3. The electronic device mounting apparatus of claim 2, wherein the power output device comprises an inductive charger primary coil, which primary coil is positioned adjacent the support portion to charge a mobile device supported thereon.

4. The electronic device mounting apparatus of claim 3, wherein the power output device comprises a charging plug for a mobile device.

5. The electronic device mounting apparatus of claim 4, wherein an opening is provided in the housing through which a charging cable passes.

6. The electronic device mounting apparatus of claim 5, wherein the support portion comprises a lip for supporting a mobile device, which lip comprises a recess to accommodate the charging plug and/or cable when a mobile device is so supported.

7. The electronic device mounting apparatus of claim 4, wherein:
 the charger comprises a cable between the plug and the power output device;
 the power output device comprises a charger plug for a mobile device; and,
 comprising a cable retractor configured to retract the cable within the housing.

8. The electronic device mounting apparatus of claim 4, wherein the support portion is configured to support a first device for inductive charging using the primary coil, and a second device for charging using the charger plug.

9. The electronic device mounting apparatus of claim 1, wherein the mounting portion is an inwardly projecting flange of the housing.

10. The electronic device mounting apparatus of claim 9, wherein the mounting portion has an open profile in at least one condition of the apparatus.

11. The electronic device mounting apparatus of claim 10, wherein the mounting portion comprises a cross-member and two side members extending normal to the cross-member to define an inverted U-shaped mounting portion in use.

12. The electronic device of claim 9, wherein the housing further includes an opening for receiving the plug socket wall plate, and the flange of the mounting portion projects inwardly into the opening and is configured to be inserted between the loosened plug socket wall plate and the associated wall, such that, when tightened, the flange is parallel to, sandwiched between, and in contact with both the plug socket wall plate and the wall to support the electronic device mounting apparatus.

13. The electronic device mounting apparatus of claim 1, wherein the support portion comprises a flat planar portion for supporting a mobile device.

14. The electronic device mounting apparatus of claim 13, wherein the support portion is inclined at an angle between 1 and 45 degrees to the vertical in use.

15. The electronic device mounting apparatus of claim 14, wherein the support portion is inclined at an angle between 1 and 10 degrees to the vertical in use.

16. The electronic device mounting apparatus of claim 13, wherein the support portion comprises a lip configured to support an edge of a mobile device in use.

17. A method of installing an electronic device mounting apparatus according to claim 1, comprising the steps of:
   providing a plug socket installed on a wall, the plug socket having a back plate;
   loosening the back plate to move the back plate away from the wall;
   inserting the mounting portion between the back plate and the wall;
   tightening the back plate to sandwich the mounting portion between the back plate and the wall; and
   placing the support portion over the plug socket.

18. An electronic device mounting apparatus according to claim 1 wherein:
   the electronic device is a speaker facing outwardly from the support portion.

19. The electronic device mounting apparatus of claim 18, wherein the mounting portion has an open profile in at least one condition of the apparatus.

20. The electronic device mounting apparatus of claim 19, wherein the mounting portion comprises a cross-member and two side members extending normal to the cross-member to define an inverted U-shaped mounting portion in use.

21. The electronic device mounting apparatus of claim 18, wherein the speaker support portion is inclined at an upward angle between 1 and 45 degrees to the vertical in use.

22. A method of installing an electronic device mounting apparatus according to claim 18, comprising the steps of:
   providing a plug socket installed on a wall, the plug socket having a back plate;
   loosening the back plate to move the back plate away from the wall;
   inserting the mounting portion between the back plate and the wall;
   tightening the back plate to sandwich the mounting portion between the back plate and the wall; and
   placing the support portion over the plug socket.

* * * * *